Feb. 13, 1923. Re. 15,540
L. DE FOREST
MEANS FOR TRANSFORMING MECHANICAL VIBRATIONS INTO ELECTRICAL VIBRATIONS
Original Filed July 15, 1919
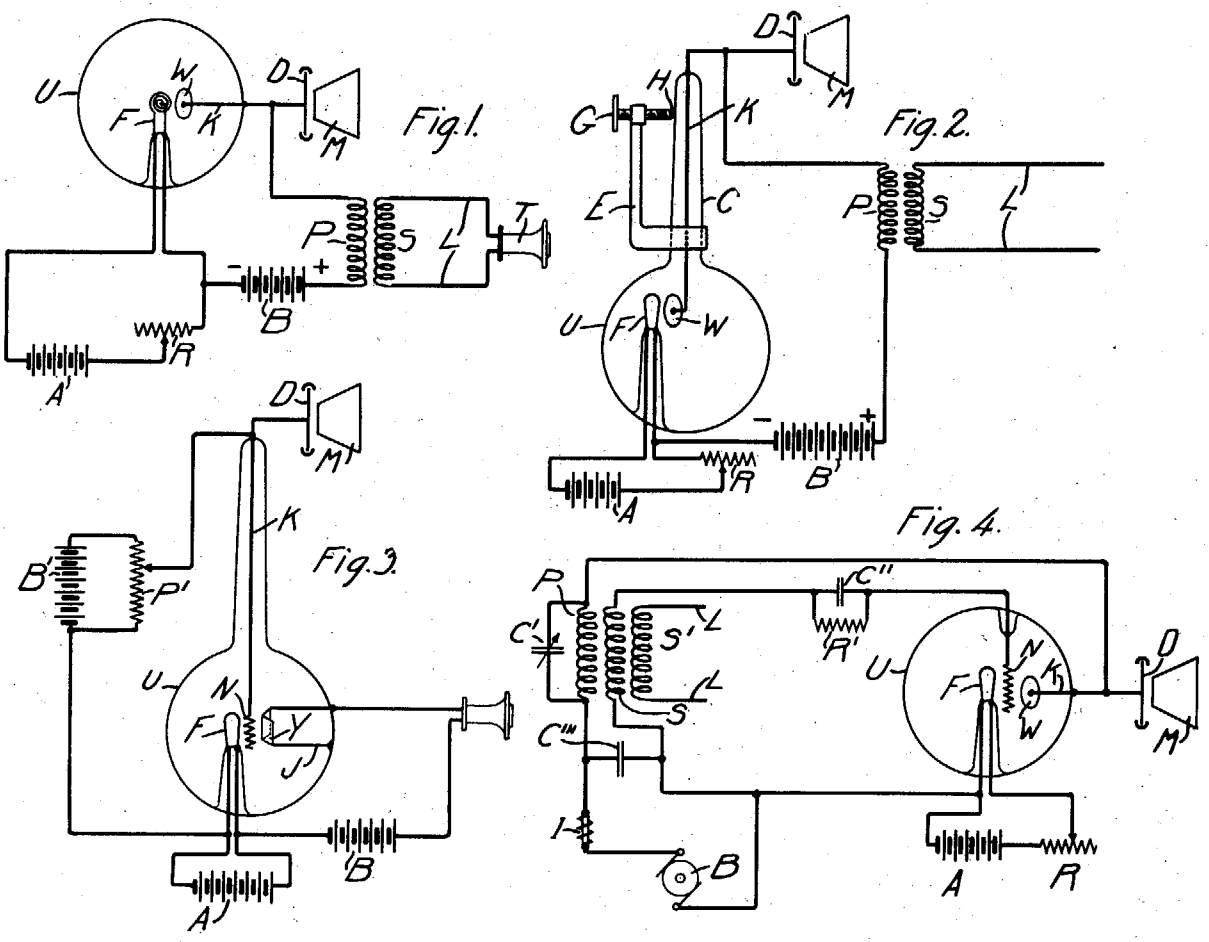
Inventor:
Lee de Forest,
by Darby & Darby
Att'ys Reissued Feb. 13, 1923. Re. 15,540

UNITED STATES PATENT OFFICE.

LEE DE FOREST, OF NEW YORK, N. Y., ASSIGNOR TO DE FOREST RADIO TELEPHONE AND TELEGRAPH COMPANY, OF NEW YORK, N. Y., A CORPORATION OF DELAWARE.

MEANS FOR TRANSFORMING MECHANICAL VIBRATIONS INTO ELECTRICAL VIBRATIONS.

Original No. 1,309,753, dated July 15, 1919, Serial No. 73,678, filed January 22, 1916. Application for reissue filed July 13, 1921. Serial No. 484,532.

*To all whom it may concern:*

Be it known that I, LEE DE FOREST, a citizen of the United States, residing at New York, county of Bronx, and State of New York, have made a certain new and useful Invention in Means for Transforming Mechanical Vibrations into Electrical Vibrations, of which the following is a specification.

The invention relates to means for changing mechanical into electrical vibrations.

The object of the invention is to provide means which are simple and efficient for changing mechanical vibrations into electrical vibrations, and by mechanical vibrations I mean vibrations created mechanically as distinguished from vibrations created electrically or electro-magnetically.

A further object of the invention is to accomplish the purposes above referred to by means of an evacuated vessel containing electrodes therein.

Further objects of the invention will appear more fully hereinafter.

The invention consists substantially in the construction, combination, location and relative arrangement of parts and circuit arrangements associated therewith, all as will be more fully hereinafter set forth, as shown by the accompanying drawing, and finally pointed out in the appended claims.

Referring to the drawing,—

Figure 1 shows one circuit arrangement embodying my invention.

Fig. 2 shows a modified construction of the vessel employed in accordance with my invention.

Fig. 3 is a diagrammatic view showing a modified circuit arrangement.

Fig. 4 shows a further modified arrangement.

The same reference character refers to the same part wherever it occurs throughout the several views.

In the drawings U generally designates an evacuated vessel, preferably spherical in form as shown, containing a filament F heated from suitable source, such as a battery A, controlled by resistance R.

In the arrangement shown in Fig. 1, I prefer to form the filament electrode F, coiled, as shown, and placed in a plane parallel to the plane of the plate electrode, which in this instance is in the form of a circular plate and is mounted on a wire or conducting rod K sealed in one side of the vessel and extending and rigidly fastened to diaphragm D closing a mouth piece designated at M. A flux source, such as battery B, is connected by its negative terminal to one side of the filament F and by its positive terminal through one coil P of a telephone transformer to the plate electrode W, as shown. The secondary coil S of the telephone transformer is connected to the outgoing line and thence to a distant telephone receiver, diagrammatically designated at T.

The operation of the device thus described, is very simple. Sound waves through mouth piece M, impinge on the diaphragm D, and its to and fro vibration or longitudinal motion is transmitted mechanically by means of the rod K to the plate electrode W, thereby varying in accordance therewith the distance between the plate electrode W and the cathode or filament electrode F. These minute variations in the distance between the electrodes, cause corresponding variations in the momentary amount of flux current from source B passing by ionic conductivity from the filament F to the plate W. They are then transmitted over the telephone line L to the telephone receiver T, as will be readily understood.

I find that this arrangement which is in substance a substitute for a microphone, is free from most of the imperfections of any mechanical resistance varying device such as are inherent to the carbon granule microphone, and that in consequence a clearness and fidelity of sound reproduction is obtained in the telephone receiver far superior to that possible when a microphone is employed.

The magnitude of vibrations obtained in the device shown in Fig. 1, even when the vessel U is made of large diameter, and of thin glass, is not great, and there is obviously a mechanical limit to the nearness with which the plate W, can be placed to the filament or cathode F, in order to insure against actual contact of the two electrodes.

To remedy this one objection I have found that the arrangement shown in Fig.

2, is highly effective. In this form the evacuated vessel U has a long tubular neck C through the end of which is sealed the wire rod or arm K, carrying at its lower end the plate electrode W in close proximity to the filament F as hereinbefore described.

The long glass stem or neck C, is quite flexible and permits therefore, relatively large movements of the arm or rod K sealed therein. If desired, a metal support E may be fastened around the base of the neck C, as shown, provided with a thumb screw G for slightly bending the glass neck, thereby affording means for adjusting the position of the plate electrode W, relative to the filament F. A piece of rubber, felt or other soft material designated at H, forming a tip for the screw G permits the glass neck to be vibrated slightly as impelled by the rod K, and at the same time it dampens any natural vibration of the neck C. It will be noticed that the circuit arrangement of this figure is identical to that of Fig. 1, and the principle of operation thereof is the same.

In Fig. 3, I show a vessel U similar to that of Fig. 2, but I employ in connection therewith two cold electrodes associated with the filament electrode F. In this arrangement the arm K terminates in a wire interposed between the filament electrode F, and the third electrode Y. The electrode Y is preferably in the form of a plate, bent at an angle as shown, and is supported by a suitable rod J sealed into the vessel U and the plate is connected through a telephone transformer as shown in Figs 1 and 2, to the telephone T or direct thereto, and to the source B, and one terminal of the filament F all as shown. In this instance an electric charge, the amount and polarity of which is controlled by the potentiometer P′, and battery B′, connected to the filament F, and the arm K, is maintained on the vibrating member N. The operation of the device described is similar to the operation of the arrangements shown in Figs. 1 and 2.

In Fig. 4, I show an audion microphone similar to that shown in Figs. 1 and 4. The grid electrode N and the plate electrode W, are connected to the filament F, through inductively associated coils S and P, respectively of a regenerative oscillating circuit. A tuning condenser C′ is shown connected around the coil P, and a stopping condenser C″, shunted by a high resistance leak path R′ is connected in the grid circuit. In this arrangement I prefer to employ a direct current generator B for the source of the flux current in the circuit of which is inserted an impedance or choke coil I. C‴ is a shunting capacity connected across the terminals of the generator as shown. The output or load circuit L is inductively or otherwise associated with one or both of the coils P and S through a third coil S′.

By this arrangement the oscillating audion system becomes a generating source of undamped electrical oscillations suitable, for example, in a radio telephone transmitting system. The amplitudes of these oscillations are modulated by the movements of the voice controlled electrode W.

It is obvious that many other arrangements will readily occur to those skilled in the art without departing from the broad scope of my invention as defined in the claims.

Therefore, what I claim as new and useful and desire to secure by Letters Patent, is:

1. In a device of the class described, the combination with a source of mechanical vibrations, a vessel provided with a comparatively thin neck, electrodes sealed in said vessel, one of said electrodes extending through said neck and connected to said source, said mechanical vibrations causing corresponding vibrations of said neck and variations in an output circuit also connected to said electrodes.

2. In a device of the class described, the combination with a source of mechanical vibrations, a vessel provided with a comparatively thin neck, electrodes sealed in said vessel, one of said electrodes extending through said neck and connected to said source, said mechanical vibrations causing corresponding vibrations of said neck and variations in an output circuit also connected to said electrodes, and means for detecting the variations of said output circuit.

3. In a device of the character described, a vessel comprising a body provided with a comparatively long thin neck, an electrode sealed in the neck of said vessel and extending into the body thereof, a second electrode in said vessel, said first electrode being capable of movement relative to said second electrode.

4. In a device of the character decribed, a vessel having a comparatively thin neck, electrodes sealed in said vessel, one of said electrodes extending through said neck, said neck and electrode being capable of vibration to cause variations in an output circuit connected with said electrodes.

5. An electric relay comprising a thermionic valve having a cathode system and an anode system fixed with respect to each other in which is mounted a movable control element adapted to render it more or less conductive, substantially as described.

6. The combination with a relay according to claim 5, of a source of electromotive force connected with the control element, substantially as described.

7. The combination with an electric relay comprising a thermionic valve having cathode and anode members, of a movable element mounted within the valve and controlling the conductance thereof, an electric circuit including a source of electric current and the cathode and anode members, and electromagnetic mechanism controlled by the circuit substantially as described.

8. In a device of the class described, two electrodes fixed relative to each other, one of said electrodes being adapted to emit and the other to collect electrons, and a third electrode movable with respect to said electrodes whereby the electron flow between said fixed electrodes may be varied.

In witness whereof, I hereunto subscribe my name, this 23d day of June, A. D., 1921.

LEE DE FOREST.